FIG. 1
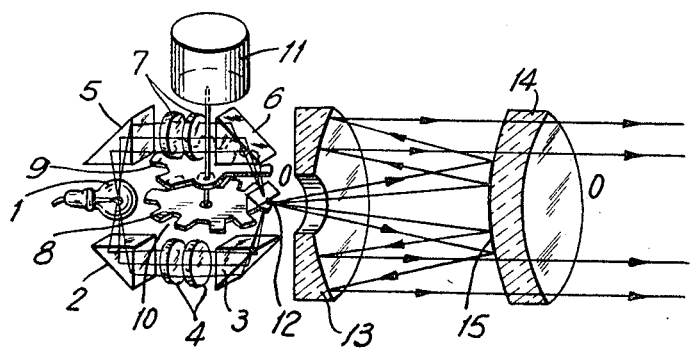
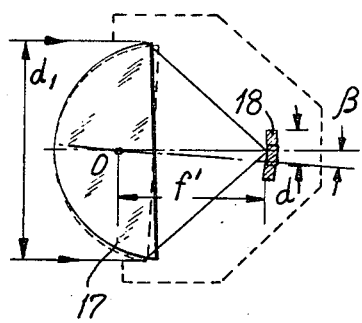
FIG. 2a
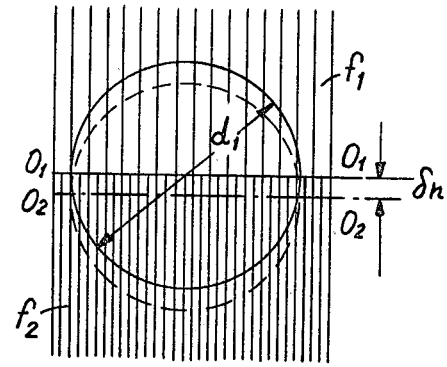
FIG. 2b

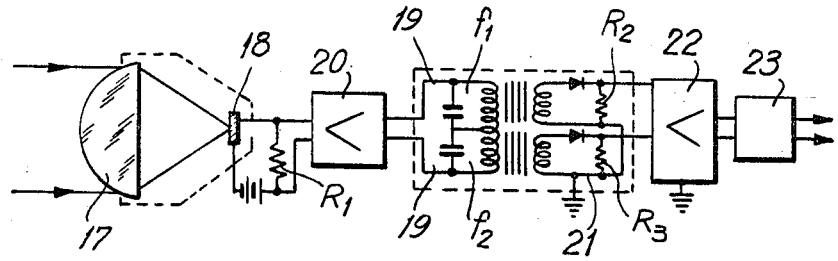
FIG. 6
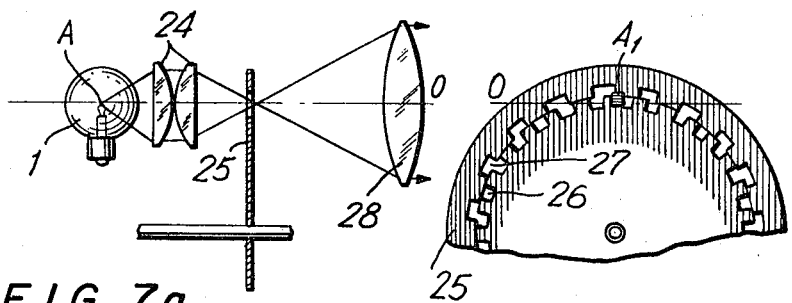
FIG. 7a
FIG. 7b
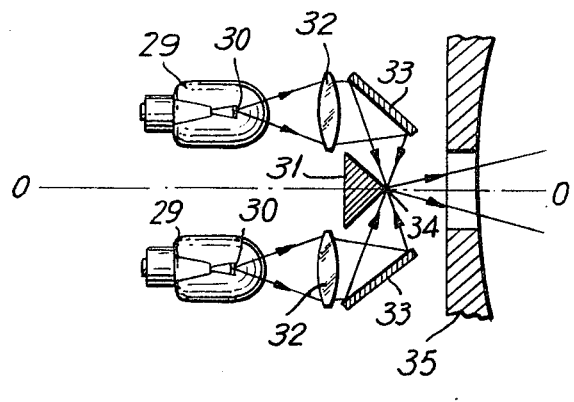
FIG. 8

3,452,207
DEVICE FOR CONTROLLING MACHINES, MAINLY DREDGERS, WITH OPTICAL BEAM
Solomon Tobiasovich Tsukkerman, Leningrad, U.S.S.R., assignor to Leningradsky Institute Tochnoy Mekhaniki i Optiki, Leningrad, U.S.S.R.
Filed Oct. 16, 1964, Ser. No. 404,373
Int. Cl. H01j 39/12
U.S. Cl. 250—215                                    7 Claims

ABSTRACT OF THE DISCLOSURE

A method and device for remotely controlling the travel of machines in a given plane along a prescribed line or a curvilinear path, in which the component parts of a directed optical beam are modulated with different frequencies or colored with different colors and a sharp division is formed along the axis of the beam by positioning the edges of a beam-splitting prism or a compound light filter in the focal plane of the optical device. The beam is received on the machine whose travel is to be controlled and a composite electrical signal is produced on the machine in response to the received beam. The signal is divided into corresponding frequency components which are compared to produce a signal for controlling the machine's travel the different colors of the parts of the controlling beam are respectively associated with a manual control in one plane and an automatic control in another plane.

---

This invention relates to devices designed to control machines, particularly dredgers, with a directed optical beam to be generated by a stationary control part and received by the receiving part of the device, said latter part being disposed either on the controlled machine, or on the working member thereof.

Such devices are used for various earth working operations, road building, mining, and the like, as well as when erecting large engineering structures to provide for strictly rectilinear movement of the machine or of its working member (for instance, when laying out drainage and irrigation canals, canalization collectors or mine drifts to observe the specified inclination with the accuracy of one angular minute, or better).

Higher accuracy is required when building airfields, railroads and highways and, finally, still higher precision is necessary when machining guide surfaces of large metalworking machines, bearings of propeller shafts, etc.

The work mentioned above has been carried out with surveying instruments or by preliminary staking out with the help of optical instruments. Ready constructions were checked following the same procedure.

This method being very labor-consuming, requires highly skilled personnel, reduces efficiency of the machines and fails to provide for the necessary accuracy due to errors which accumulate in the process of staking out and building of the structure in accordance with the preliminarily marked profile.

In order to automate the control, particularly of dredgers, follow-up systems were used in the form of the so-called levelling wire. This wire was stretched between stakes along the pre-levelled path and an electromechanical or inductive probe or roller mounted on the machine was then slided therealong, controlling the movement of its working member.

Those systems facilitate the work of the machine driver, but, nevertheless they require much time and labor for preliminary tracing, staking out in accordance with the readings of the surveyor's level and for fixing the levelling wire; besides, these devices do not provide for required precision due to slack of the wire and heeling of the machine.

Also known are devices which comprise a surveyor's level, whose tube is used to observe a "mark," made on the working member of the machine. In case the mark is shifted from the cross of the tube, the operator, working with the surveyor's level, makes use of either wire or wireless communication to instruct the driver to align the mark with the axis of the tube.

The drawback of such devices is that the efficiency of the machine is reduced due to its limited speed, resulting from the operator's commands coming too late, lack of automation in control, and also due to the necessity of having skilled personnel and either a wire or wireless communication system which makes the exploitation of machines more expensive.

Also known at present are gyroscopic devices mounted directly on the working machine to control its movement along a preset slope or course. These devices, however, do not provide required accuracy of movement due to errors inherent in the gyroscopic devices and amounting to 5–7 angular minutes, plus the errors accumulating during movement of the machine due to the absence of rigid coupling with the reference points and between the travelling body of the machine or its working member and the section of the structure profile being processed.

Attempts were made to eliminate the above-mentioned disadvantages and to provide devices which would control the machine or its working member by means of a nonmodulated sharp optical beam, i.e. by a beam, the diameter of which is less than the value of the tolerable error.

But due to small power and great diffraction dispersion of a sharp beam, the energy obtained at the input of the receiver, positioned at distances of several dozens of meters, is already so insufficient that it is impossible to separate a useful signal from foreign fluxes of light (interferences).

The object of the proposed invention is to eliminate the disadvantages of the devices known in the present state of the art, to provide automatic operation of the machines and combine this operation with preliminary levelling of the structure profile which can be carried out automatically with precision equal to, or greater than that obtained in case of preliminary geodetic staking out (i.e. up to 5–10 angular seconds), and to provide automatic movement of the machine or of its working member along a curvilinear path with the possibility of combining automatic control in one plane with manual control in another plane.

The basic novel feature of the proposed device is the use of a visible or an invisible beam as a reference straight line, i.e. as a reference line similar to that used in the usual visual alignment with a straight line by means of optical instruments.

The directed optical beam generated by the control part is modulated to obtain a sharply defined equisignal zone along its axis. The diameter of the control beam can be however great.

The automation is achieved by forming a modulated optical pencil with sharply defined boundary of frequency or modulation intensity along the axis of the pencil. Such a pencil permits remote and automatic control of an object provided with a photoelectric receiver, said receiver employing a method known in radar techniques as "equisignal zone riding" or "beam riding." An important advantage of the "beam-control system" method is that the feedback from the controlled object becomes unnecessary: the feedback loop is closed at this very object.

The control part of the device is an optical beam generator, e.g. a searchlight with a device for modulation of the optical beam. Therefore a sharply defined equisignal zone along the axis of said beam is provided.

The receiving part, mounted on the controlled machine or on its working member comprises a photoelectric device which converts the optical beam into an electric signal and an amplifier with electric circuits tuned to the modulation frequencies of said beam and a servomotor connected with the actuating mechanism of the machine, said servomotor being controlled by the amplified electric signals, coming from said receiving part.

Such solution of the problem provides for remote automatic control of the machine or of its working member with high accuracy from a distance of 1000 metres or more. The proposed device is insensitive to atmospheric, light or other interferences, the total power consumed by the whole control part not exceeding 25–50 w., depending on the required distance of control.

The use of the optical beam increases the attainable angular accuracy of control by several orders as compared with a radio beam.

As it is known, the limit accuracy $\delta$ of control by means of a radio or electric beam is determined by diffraction phenomena and is approximately equal to $\delta = \lambda/D$ radian where $\lambda$ is the wavelength and $D$ is the diameter of the antenna or searchlight objective in cm.

Assuming that for the invisible (infrared) beam $\lambda = 1$ micron $= 0.0001$ cm. and the diameter of the objective $D = 10$ cm. we obtain $\lambda = 0.0001/10$ radian, or $\delta = 2$ angular seconds.

The device for modulating the optical beam is made in a form of a beam-splitting prism with two or more reflecting faces disposed in the focal plane of the searchlight objective, and rotary disks with modulating indentations positioned outside the focal plane of said objective. The use of a prism with three or four faces provides the possibility of controlling the machine both in horizontal and vertical directions. The electric network of the receiving part is provided with a corresponding number of circuits tuned to modulation frequencies.

In other embodiments of the invention the device for modulating the optical beam and obtaining a sharply defined equisignal zone along its axis is made either in the form of a rotary disk with two rows of indentations placed in the focal plane of the searchlight objective, or as a number of pulse gas-discharge tubes housed in the searchlight, said tubes having different flash repetition frequencies.

Additionally, the present invention provides the possibility of using lasers with different pulse repetition frequencies with a dividing prism positioned therebetween, as the control part and the optical beam modulating device.

If it is necessary to combine automatic control of the machine in one plane with manual control in another plane, a compound light filter is located in the focal plane of the searchlight objective for different coloring of the right and left (or the upper and lower) parts of the directed beam, while the controlled machine is fitted with a view finder used to visually control the colored beam and to direct the machine in such a way that it should move along the uncolored part of the beam (i.e. along its axis).

To ensure automatic remote control of the machine movement along the curvilinear path, the searchlight is provided with a drive with a programmed control to effect turning of said searchlight both in the horizontal and vertical planes, said drive being connected with an automatic range-finder, the latter being located either on the receiving or on the control part of said device.

The proposed device is illustrated by the drawings in which:

FIG. 1 is the optical diagram of the control part of one of the embodiments of the device with two modulating disks;

FIGS. 2a and 2b show the optical circuit of the device receiving part;

FIG. 6 shows the electric circuit of the receiving part of the device;

FIGS. 7a and 7b show the optical circuit of the second embodiment of the control part of the device with one modulating disk;

FIG. 8 is a modification of the control part with pulse gas-discharge tubes;

Figure 3:
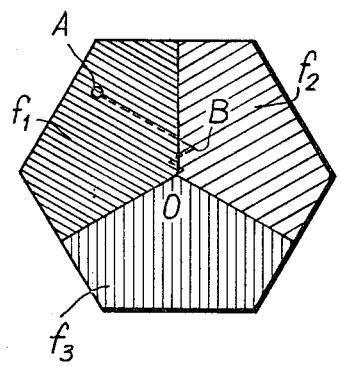
FIG. 3 shows a trihedral beam-splitting prism used with the optical circuit of the device control part.

The control part, which is a generator of a directed optical beam, e.g. a searchlight, used to generate a directed pencil of optical (visible or invisible) beams for controlling the machine in the vertical plane comprises light source 1; prisms 2 and 3 with condenser 4 and prisms 5 and 6 with condenser 7; rotary disks 8 and 9 with modulating indentations 10; electric motor 11, imparting rotary movement to disks 8 and 9, beam splitting prism 12 with reflecting faces; lenses 13 and 14 of the searchlight objective; section 15 of lens 14 has a mirror coating which functions as a convex mirror (FIG. 1).

In this case an incandescent lamp is used as a light source.

Figure 4:
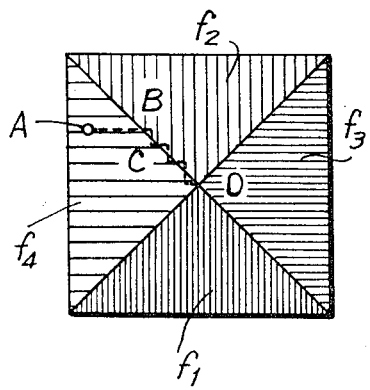
FIG. 4 shows a tetraheddral prism to be used similarly to that shown in FIG. 3.
Figure 5:
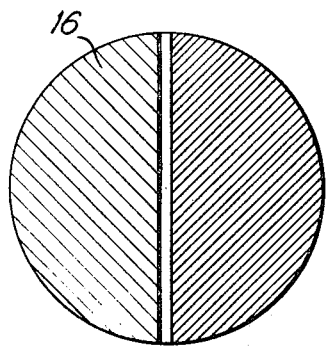
FIG. 5 is a compound light filter mounted in the device control part in case of manual control of the machine in one plane.

Beam-splitting prism 12 may have three (FIG. 3) or four (FIG. 4) reflecting faces and therefore the machine can be controlled in two planes; the number of prisms 2, 3 and condenser 4 in the searchlight is increased accordingly, to illuminate all the faces of the prism, as well as the number of rows of the modultaing indentations. In case of manual control of the machine in one of the planes, e.g. in the horizontal plane, a compound light filter 16 (FIG. 5) is disposed near the focal plane of the searchlight, which provides coloring of the right and left parts of the directed beam in the visible region. In the middle part of the light filter a narrow white strip may be left.

The receiving part of the device (FIGS. 2a, 2b) comprises objective 17 and photoelectric receiver 18, as well as electric network (FIG. 6) with circuits 19 tuned to two frequencies ($f_1$ and $f_2$) modulating the directed beam in case of control in one plane, preamplifier 20, comparison bridge 21, final amplifier 22 and servomotor 23 connected with the working member of the machine. When beam-splitting prisms with three or four faces are used, the number of circuits 19 is increased accordingly.

In FIGS. 7a, b, a second embodiment of the control part of the proposed device is represented. In this embodiment disposed behind light source 1 is condenser 24 which produces image $A_1$ of luminous body A on rotary modulating disk 25 provided with two rows of indentations 26 and 27, the number of indentations 26 and 27 being unequal. Disk 25 is disposed in the focal plane of objective 28.

In FIG. 8 still another embodiment of the control part of the device is illustrated. This embodiment employs light source pulse gas discharge tubes 29 as a power source, the image of luminiscent body 30 of said tubes is obtained on the reflecting faces of beam-splitting prism 31 with the help of condensers 32 and inclined mirrors 33. Edge 34 of prism 31 is in the focal plane of catadioptric system 35. An equisignal zone along the directed beam is formed due to different flash repetition frequencies of tubes 29.

Figure 9:
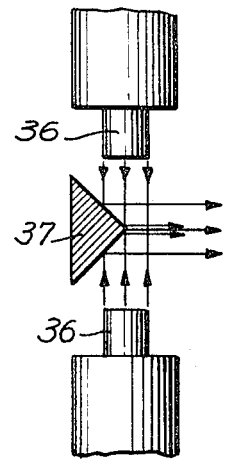
FIG. 9 shows a modification of the device control part with lasers.

FIG. 9 shows a fourth embodiment of the device control part with lasers 36 and beam-splitting reflecting prism 37 being used as the searchlight and the modulating means.

Since lasers have a directed pencil beam, all the parts of the searchlight and modulator described above, except the beam-splitting prism, become unnecessary.

The equisignal zone in this embodiment is obtained due to the different pulse frequencies of the lasers.

Figure 10:
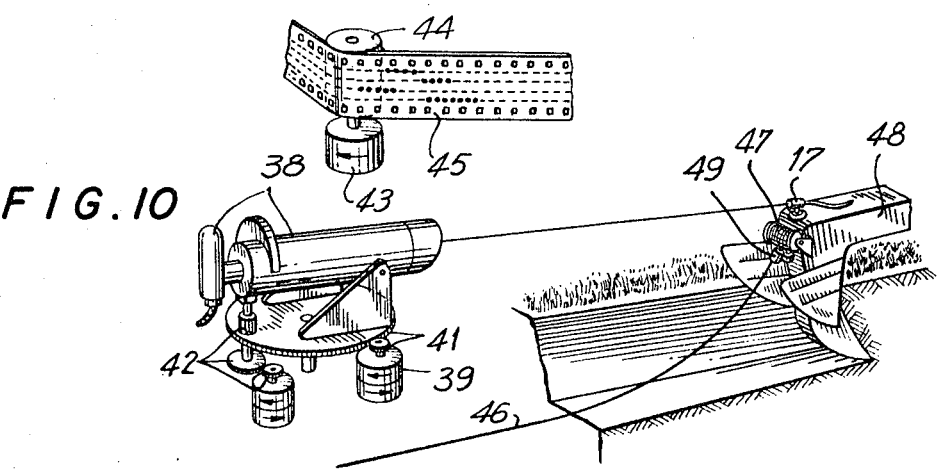
FIG. 10 is a circuit of the programmed control of the searchlight drive with a wire range-finder.

FIG. 10 represents the circuit of the programmed control of the device transmitting part with the machine, travelling along a curvilinear path being controlled automatically.

Searchlight 38 of the control part is connected with horizontal drive 39 and vertical drive 40 via gears 41 and 42 respectively. Said drives are controlled with a programmed device comprising drive 43, drum 44 and punched tape 45.

Drive 43 of the programmed device, in its turn, is controlled by a range-finder, i.e. wire rope 46, paid out from reel 47, mounted on controlled machine 48.

The distance covered by machine 48 is registered by reading magnetic head 49 in compliance with magnetic "marks," recorded on wire rope 46; the respective pulses are transmitted via said wire rope to drive 43.

Figure 11:
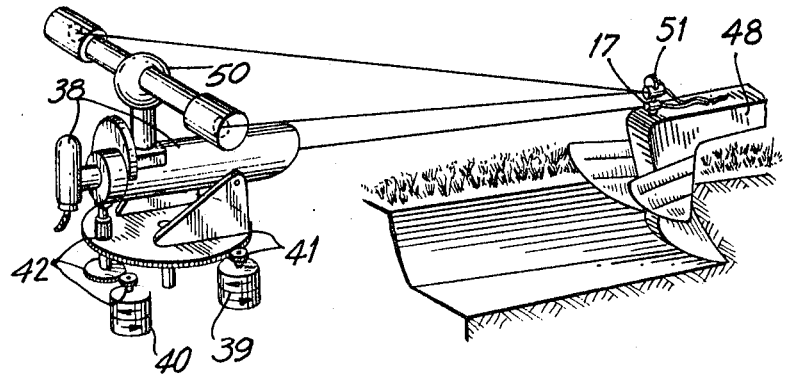
FIG. 11 shows the same circuit as that represented in FIG. 10 but with an automatic self-contained range-finder being employed.

FIG. 11 illustrates another embodiment of the programmed device in accordance with FIG. 10, with an automatic self-contained range-finder 50 being used instead of a wire range-finder, said automatic self-contained range-finder being mounted on searchlight 38, and used for measuring the distance covered by controlled machine 48 with the help of luminous mark 51 disposed above the receiving objective mounted on said machine.

Instead of the self-contained range-finder, an automatic radiolocation or light range-finder can be mounted on the searchlight, and in this case a corresponding angle reflector is mounted on the controlled machine.

The optical circuit of one of the embodiments of the device (FIG. 1) illustrates its operating principles. The luminous body of light source 1 is projected by prisms 2, 3 and 5, 6 and condensers 4 and 7 into the focal plane of the objective comprising lenses 13 and 14, one edge of fixed beam-splitting prism 12 being in said focal plane. Positioned in front of the faces of said prism is the modulator made as two rotary disks 8 and 9 driven by electric motor 11 and having different numbers of indentations 10.

Light beams are modulated by said disks with different frequencies, and the light beams modulated with frequency $f_1$ corresponding to the number of indentations 10 of disk 8 which travel above optical axis O—O, while the light beams modulated with frequency $f_2$ correspond to the number of indentations of disk 9 which travel below said axis. At a certain distance from the objective of the searchlight) and beyond up to the maximum distance of control, the border between the light beams modulated with different frequencies forms a sharply defined equisignal zone. In case of an aberration-free searchlight objective this border would be straight line $O_1O_1$ (FIG. 2b) representing the edge of prism 12. Therefore when aperture $d_1$ of the receiving part objective 17 (FIG. 2a) coincides with optical axis O—O of the searchlight, i.e. when straight line $O_1O_1$ divides the area of aperture $d_1$ into two equal parts, equal amounts of radiant energy modulated with frequencies $f_1$ and $f_2$ enter the aperture. When the center of aperture $d_1$ is displaced from line $O_1O_1$ e.g. to line $O_2O_2$ by value $\delta h$ the energy of one pf the frequencies $(f_2)$ coming to objective 17 increases, while that of the other frequency $(f_1)$ decreases.

Therefore after the amplified signal of photoreceiver 18 is divided in circuits 19 according to frequencies and the amplitudes of the signals thus obtained are compared in bridge 21, a mismatching signal appears, said signal being supplied into final amplifier 22 and therefrom to servodrive 23 of the actuating mechanism of the machine.

It should be noted that angular deviations and swayings of the machine, causing inclination of the device receiving part toward the axis of the control beam do not affect the operation or accuracy of the proposed device, since the operation of the receiving part depends only on the position of the center O of its objective (FIG. 2a) with respect to the beam axis. The tolerance of angular deviation should be calculated for each case in particular. Thus, if the focal length of the objective of the receiving part is 30 mm. and the diameter of the sensitive area of photocell 18 $d=6$ mm. (FIG. 2a), the tolerance of angular deviation will be $$2p \cong 6/30 = 0.2, \text{ i.e. } p \approx \pm 6°$$

When a tetrahedral prisms is used (FIG. 3) the fluxes of light falling on its faces, are modulated with different frequencies $f_1$, $f_2$ and $f_3$, and three circuits tuned to those frequencies are incorporated in the amplifying unit. The amplitude of the signal with frequency $f_1$ is compared with that of the signal with frequency $f_2$; in accordance with the sign of the difference therebetween the controlled machine is turned in the required direction in the horizontal plane until the amplitudes of these signals become equal.

Simultaneously the amplitudes of the signals with frequencies $f_1$ and $f_2$ are compared in the amplifier with those of $f_3$.

If signal $f_3$ is less than signal $f_1$ or $f_2$, the controlled machine moves in the vertical plane until the signals become equal, or vice versa.

If, for example, the recieving part of the device is at point A (FIG. 3) which is within the range of $f_1$, and $f_1$ exceeds $f_2$ and $f_3$, therefore the receiving part with the controlled machine will move simultaneously to the right and downwards. If as a result in the shift of the receiving part to point B, as shown by the dotted line, which is within the range of $f_2$, the following inequality of signals holds: $f_2 > f_1$ and $f_2 > f_3$; the machine with the receiving part will move to the left and downwards. This process will continue until the receiver reaches the beam axis, i.e. point O, where the signals of all the three frequencies are equal.

When a tetrahedral prism (FIG. 4) and an amplifying unit with four circuits tuned to frequencies $f_1$ and $f_2$, $f_3$ and $f_4$ are used, the motion of the controlled machine in the vertical plane is determined by the sign of the difference between the signals, with frequencies $f_1$ and $f_2$, while the motion of the controlled machine in the horizontal plane is determined by the sign of the difference between the signals with frequencies $f_3$ and $f_4$.

Thus, if the receiving part is at point A which is within the range of $f_4$, the machine will start moving to the right since the signal $f_4 > f_3$. When the receiver has passed over to point B the value of $f_2$ will exceed that of $f_1$, and therefore the receiver will move downwards to point C where $f_4 > f_3$. This process will continue (as is shown by the dotted line), until the receiver reaches point O, where the signals of all the four frequencies are equal.

In another embodiment of the invention for the automatic control in one plane, instead of disks 8 and 9 with indentations 10 one rotary disk 25 with two rows of indentations 26 and 27 is installed in the focal plane in front of beam-splitting prism 12 (FIG. 7), said disk, performing the same function of modulating the directed beam pencil with two different frequencies.

The edge of beam-splitting prism 12 (FIG. 1) disposed in the focal plane of the objective eliminates the effect of the beat of the division line between the circumferences with indentations 26 and 27 and provides for higher accuracy.

In yet another embodiment of the invention (FIG. 8) pulse gas-discharge tubes 29 are used with different flash-repetition frequencies. The image of luminous body 30 of these tubes is obtained on the faces of beam-splitting prism 31 due to the use of condensers 32 and inclined mirrors 33. Edge 34 of prism 31 is disposed in the focal plane of objective 35 of the searchlight which is similar to the objective represented in FIG. 1. In this case modulating disks become unnecessary since the equisignal zone along the axis of the control beam is obtained due to different flash-repetition frequencies of tubes 29.

FIG. 9 shows still another embodiment of the invention where instead of the searchlight, lenses, condensers and the objective lasers 36 are used with beam-splitting prism 37 disposed therebetween. Since lasers create a directed beam pencil, no optical system with optical beam modulation means is required to obtain the equisignal zone.

The optical circuit of the receiving part in all the embodiments remains the same.

In order to make the operation of the device completely automatic and provide for the possibility of controlling the machine in its travel along a curvilinear path, searchlight 38 (FIG. 10) comprising a light source, an optical system and a modulator, is driven by step-by-step (follow-up) electric motors 39 (for horizontal travel) and 40 (for vertical travel) through gears 41 and 42. These motors are actuated by a program device which in this case comprises drive 43 which rotates drum 44 with punched tape 45. The program punched on the tape contains a table of horizontal and vertical angles of direction of the axis of searchlight 38 as the function of the distance between the controlled machine and the searchlight, said distance being measured by the wire rope range-finder, which controls drive 43 of drum 44 with punched tape 45. Said range-finder comprises wire rope 46, paid out from reel 47 positioned on controlled machine 48. The distance covered by said machine is registered by magnetic head 49.

FIG. 11 shows another version of automatic control in which automatic self-contained range-finder 50 is employed, said range-finder being mounted directly on searchlight 38 and measuring the distance to said controlled machine 48 by mark 51 fixed thereon. Output signals of range-finder 50 directly control drive 43 of the program device.

Radiolocation or light range-finders operate in a similar fashion.

Figure 12:
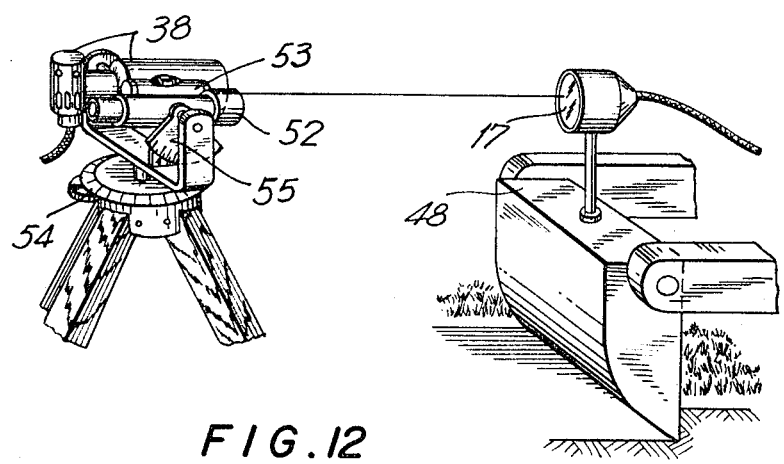
FIG. 12 is a general view of the proposed device for automatic control of the working member of the dredger in a vertical plane.

FIG. 12 represents a general view of the device for controlling a dredger in the vertical plane. Searchlight 38 is provided with optical sight 52 and level 53 which serve to adjust and set the predetermined incline.

Said searchlight is also provided with dials 54 and 55 the readings of which permit sending of the control beam in the required direction both in the horizontal and vertical planes.

Optical part (objective with a photoreceiver) 17 of the receiving part is in this case mounted on the dredger working member.

What is claimed is:

1. A method for remotely controlling the travel of machines in a given plane, along a prescribed line or a curvilinear path, said method comprising producing a directed optical beam, modulating the component parts of said optical beam with different frequencies, forming a sharp division along the axis of the beam by positioning the sharp edges of a beam-splitting prism in the focal plane of the optical device, receiving said beam on the machine whose travel is to be controlled, producing a composite electrical signal in response to the received beam, dividing said signal into corresponding frequency components, comparing said components to produce a signal for controlling the machine's travel, actuating an automatic range-finder for measuring the distance to the machine being controlled and rotating the beam according to the measured distance.

2. A device for controlling machines with a direct optical beam having component parts of which are modulated with different frequencies, the device comprising a searchlight located at a certain point, the searchlight including a source of continuous radiation to produce a beam, means for obtaining a plurality of images of said beam, means for mechanically modulating said images with different frequencies, means for producing a sharp division line between different modulated component images of said beam, means for rotating the searchlight to vary the rotation of the directed beam so as to obtain the prescribed trajectory of the machine's travel, means for automatically measuring the distance to the machine being controlled, and means for automatically rotating the directed beam according to a prescribed function depending upon the distance to the machine being controlled, a receiving part on the machine being controlled, said receiving part comprising an objective lens having a photocell in its focal plane, means for dividing the composite electrical signal of the photocell into its frequency component parts, and means for comparing the frequency component parts so as to obtain signals for the automatic control of the machine's travel in the prescribed direction.

3. A device for controlling machines with a directed optical beam, having component parts which are modulated with different frequencies, the device comprising a stationary searchlight having a focal plane, a dihedral division prism having an edge located in said focal plane, said prism having faces on which are projected the images of a constant light source means for modulating said images with two different frequencies including discs rotated by a motor, said discs having equal numbers of slots, and a collecting light filter coloring the halves of the directed beam in different colors for the manual control of the machine in one of the planes, a receiving part in the machine being controlled, said receiving part having an objective lens and a photocell placed in the focal plane of said objective lens, said photocell comprising two circuits adjusted to the beam's modulation frequencies, in which circuits the photocell's composite signal is divided into the frequency component parts, and a bridge for comparing these component parts so as to emit signal for controlling the machine's operation in another plane, and a sight on the machine to be controlled and intended for the visual observation of the searchlight beam's color.

4. A device for controlling machines with a directed optical beam having components parts which are modulated with different frequencies, said device comprising a stationary searchlight having a focal plane with an objective lens thereat, a rotating disc with two rows of slots modulating the image of a continuous radiation source with two different frequencies so as to automatically control the machine in one plane, and a collecting light filter coloring the searchlight directed beam's halves for effecting manual control in another plane; a receiving part on the machine being controlled, said receiving part having an objective lens, in the focal plane of which there is a photocell and circuits adjusted to the beam's modulation frequencies and connected in series, in which circuits the composite signal is divided into its frequency component parts, and a bridge for comparing these component parts and an amplifier emitting a signal for controlling the machine, and a sight for effecting the visual observation of the searchlight beam's color.

5. A device for controlling machines with a directed optical beam having component parts which are modulated with different frequencies, said device comprising a searchlight located at a particular point, and having an objective lens with a focal plane, a beam-splitting prism having sharp edges disposed in said focal plane and having two or more faces, on which there are optically represented a corresponding number of gas-discharge light sources modulated with different frequencies, means for automatically measuring the distance to the machine being controlled, and means for automatically rotating the beam according to a prescribed function depending upon the distance to the machine to be controlled; said machine including a receiving part with an objective lens having placed in its focal plane a photocell, the composite electrical signal of which is divided into frequency component parts in circuits adjusted to the beam's modulation frequencies and connected in series with each other, the comparison between said component parts resulting in the generation of a signal for controlling the machine's operation.

6. A device for controlling machines with a directed optical beam having component parts which are modulated with different frequencies, said device comprising a searchlight located in a certain point, the searchlight comprising a beam-splitting prism with two or more faces, having sharp edges therebetween, lasers illuminating corresponding faces, each laser being electrically modulated with a different frequency; means for automatically measuring the distance to the machine being controlled and means for automatically rotating the directed beam according to a prescribed function depending upon the distance to the machine being controlled, and a receiving part on the machine including an objective lens, in the focal plane of which there is placed a photocell, the composite electrical signal of which is divided in circuits adjusted to the beam's modulation frequencies and connected in series with each other into frequency component parts, the comparison of which results in the generation of a signal for controlling the machine's operation.

7. A method for remotely controlling the travel of machines in a given plane, along a prescribed line or a curvilinear path, said method comprising producing a directed modulated optical beam with component parts having different colors, forming a sharp division along the axis of the beam by positioning the sharp edges of a beam-splitting prism in the focal plane of the optical device, receiving said beam on the machine whose travel is to be controlled, producing a composite electrical signal in response to the received beam, dividing said signal into corresponding frequency components, comparing said components to produce a signal for controlling the machine's travel, actuating an automatic range-finder by said signal for measuring the distance to the machine being controlled and rotating the beam according to the measured distance.

References Cited

UNITED STATES PATENTS

| | | |
|---|---|---|
| 2,916,836 | 12/1959 | Stewart et al. _____ 250—215 X |
| 3,079,835 | 3/1963 | Saperstein. |
| 3,224,319 | 12/1965 | Robert et al. |
| 3,224,709 | 12/1965 | Blizard. |
| 3,241,430 | 3/1966 | Kulick. |
| 3,302,512 | 2/1967 | Davidson. |

ARCHIE R. BORCHELT, *Primary Examiner.*

M. A. LEAVITT, *Assistant Examiner.*

U.S. Cl. X.R.

356—4, 152, 172